(12) United States Patent
Ryoichi et al.

(10) Patent No.: US 7,674,537 B2
(45) Date of Patent: Mar. 9, 2010

(54) DIRECT METHANOL TYPE FUEL CELL AND METHOD OF PREVENTING ELUTION OF ITS FUEL POLE, QUALITY CONTROL METHOD AND OPERATION METHOD

(75) Inventors: Okyuama Ryoichi, Takatsuki (JP); Fujita Yukio, Takatsuki (JP); Watanabe Tsutomu, Takatsuki (JP)

(73) Assignee: GS Yuasa Corporation, Kyoto (JP)

( * ) Notice: Subject to any disclaimer, the term of this patent is extended or adjusted under 35 U.S.C. 154(b) by 1196 days.

(21) Appl. No.: 10/551,018

(22) PCT Filed: Mar. 19, 2004

(86) PCT No.: PCT/JP2004/003995

§ 371 (c)(1),
(2), (4) Date: Sep. 29, 2005

(87) PCT Pub. No.: WO2004/088781

PCT Pub. Date: Oct. 14, 2004

(65) Prior Publication Data

US 2007/0054159 A1 Mar. 8, 2007

(30) Foreign Application Priority Data

Mar. 31, 2003 (JP) .............................. 2003-096236
Mar. 31, 2003 (JP) .............................. 2003-096237

(51) Int. Cl.
*H01M 8/04* (2006.01)
*H01M 8/10* (2006.01)
*H01M 4/86* (2006.01)

(52) U.S. Cl. .............................. 429/13; 429/22; 429/30; 429/42

(58) Field of Classification Search ........................ None
See application file for complete search history.

(56) References Cited

U.S. PATENT DOCUMENTS 5,523,177 A 6/1996 Kosek et al.
5,672,438 A 9/1997 Banerjee et al.
6,296,964 B1 10/2001 Ren et al.
2005/0233186 A1* 10/2005 Ryoichi et al. ................. 429/13

FOREIGN PATENT DOCUMENTS

| JP | 10-507572 A | 7/1998 |
|---|---|---|
| JP | 2001-307751 | 11/2001 |
| JP | 2003-217634 | 7/2003 |
| JP | 2004-134355 | 4/2004 |
| WO | WO 09612317 | 4/1996 |
| WO | WO 2003/107466 | * 12/2003 |

OTHER PUBLICATIONS

Proceedings of the Society of Automotive Engineers of Japan, No. 46-00, 20005062, "Analysis of Thermal Efficiency in a Direct Methanol Fuel Cell", 2000.
Journal of the Electrochemical Society (J. Electrochem. Soc.) vol. 143, No. 1, (1996), L12, "High Performance Direct Methanol Polymer Electrolyte Fuel Cells".

* cited by examiner

*Primary Examiner*—Jonathan Crepeau
(74) *Attorney, Agent, or Firm*—The Webb Law Firm

(57) ABSTRACT

Elution of a fuel electrode material into a fuel in a direct methanol fuel cell is monitored. The elution arises resulting from elution of a perfluorosulfonic acid polymer in the fuel electrode into the fuel in a high-concentration fuel equal to or more than 2 M or at an operating temperature equal to or more than 80° C. The electrode catalyst elutes into the fuel and the characteristic degrades. Operating conditions of the fuel cell, i.e., the fuel concentration and the operating temperature are limited to be less than 2 M and 80° C. or less, respectively. In addition, the elution characteristic is evaluated at the time of manufacture of the fuel cell and quality control is conducted. Further, existence of the elution is detected by a color of the fuel etc., and when the elution is detected, the upper limits of the operating temperature and the fuel concentration are decreased, so that further elution is prevented.

5 Claims, 3 Drawing Sheets

DIRECT METHANOL TYPE FUEL CELL AND METHOD OF PREVENTING ELUTION OF ITS FUEL POLE, QUALITY CONTROL METHOD AND OPERATION METHOD

BACKGROUND OF THE INVENTION

1. Field of the Invention

The present invention relates to a direct methanol fuel cell capable of direct power generation by being supplied with methanol and water as a fuel and with air as oxidation gas. Further, this invention relates to operating conditions, quality control and the like to prevent characteristic degradation of the direct methanol fuel cell, so that the direct methanol fuel cell can generate electricity stably for a long time. This invention particularly relates to a technology of preventing a fuel electrode material of the direct methanol fuel cell to be eluted into the fuel.

2. Related Art

In recent years, measures for environmental problems and resources problem have become important, and as one of the measures, the direct methanol fuel cell is being actively developed. Among the measures, especially the direct methanol fuel cell capable of using methanol to directly generate electricity without reforming and gasifying methanol is simple in structure and easy to achieve miniaturization and a weight saving.

In the direct methanol fuel cell, when a methanol aqueous solution is supplied to the fuel electrode, carbon dioxide gas will be generated by a cell reaction, and used fuel and carbon dioxide gas will be exhausted on the waste fuel side. On the other hand, in the air electrode, when air is applied as an oxidant, the cell reaction will generate water, which will be exhausted from an air exit.

The direct methanol fuel cell operating in this way uses a proton conductive solid polymer electrolyte that is typified by Nafion (registered trademark of E. I. Du Pont de Nemours and Company (Du Pont)) and is composed almost exclusively of perfluorosulfonic acid for the electrolyte membrane. However, it is known that since this electrolyte has a property of allowing methanol that is the fuel to pass through, methanol having passed through the electrolyte increases polarization of the air electrode. Therefore, it is known that methanol in the fuel has its optimum concentration at which characteristics exhibits a maximum, and it has been thought that a concentration of 1 M (mol/dm$^3$) is the best as the concentration of a methanol aqueous solution in the fuel.

For the fuel electrode, a fuel electrode catalyst obtained by making carbon powder having a high specific surface area, such as acetylene black, support platinum and ruthenium of the order of nm is used. This fuel electrode is mixed with PTFE (polytetrafluoroethylene) in order to give hydrophobicity, and further mixed with a proton conductive solid polymer electrolyte of the perfluorosulfonic acid system in order to give proton conductivity to the fuel electrode and to make the electrolyte act as a binder of the fuel electrode catalyst. The air electrode has basically the same structure as the fuel electrode. In the air electrode catalyst, platinum is supported on the carbon powder having a high specific surface area because the air electrode is resistant to suffer CO poisoning.

Outside the fuel and air electrodes, carbon paper or carbon cloth to which PTFE provides hydrophobicity is arranged as a gas diffusion layer also working a charge collector. A membrane electrode assembly (MEA) in which the fuel electrode and the air electrode are formed on a gas diffusion layer, and joined with a proton conductive solid polymer electrolyte membrane such as Nafion is called a five-layered MEA and a membrane electrode assembly (MEA) in which only fuel electrode and air electrode are formed on both sides of the proton conductive solid polymer electrolyte membrane and a gas diffusion layer is separately provided is called a three-layered MEA.

It is normally practiced that a solution of a proton conductive solid polymer electrolyte as, for example, an isopropanol solution is added to the fuel electrode and the air electrode and dried at about 70° C. after membrane formation of the fuel electrode and the air electrode. Moreover, joining of the fuel electrode and the air electrode to the proton conductive solid polymer electrolyte membrane is processed by hot press or by heated roll. The processing is done at a temperature of about 130-140° C. with pressure of about 20-100 kg/cm$^2$.

However, the above-mentioned methanol concentration is derived from a discussion based on a characteristic loss by permeation of methanol through the electrolyte membrane. It has been considered that, only if allowing that characteristic is reduced slightly, a fuel of a high concentration may be used particularly (see Proceedings of The Society of Automotive Engineers of Japan, No. 46-00, 20005062).

Moreover, also in terms of cell operating temperature, since an output characteristic of the direct methanol fuel cell is originally low compared to the solid polymer electrolyte fuel cell, it is customarily operated at a temperature as high as about 90° C. in order to attain a larger-output characteristic. Furthermore, as described in the Journal of the Electrochemical Society (J. Electrochem. Soc.) Vol. 143, No. 1, (1996), L12, recently an operation at even high temperature of about 130° C. is being examined in consideration of applications as a fuel for automobiles.

In addition, investigation to develop a proton conductive solid polymer electrolyte membrane having small methanol permeation other than perfluorosulfonic acid is being carried out, indicating that sulfonated aromatic polymers and the like are promising.

SUMMARY OF THE INVENTION

In order to achieve utilization of an above-mentioned direct methanol fuel cell, it is necessary for the cell to be stably operable without degradation for a required life that reaches thousands to tens of thousands of hours. It is indispensable to make clear degradation modes of a cell and implement effective measures for respective degradation modes in order to prevent such characteristic degradation of the cell and improve a life thereof.

As a different mode to degradation modes hitherto considered, the inventors of this invention have found a mode generated by a mechanism where perfluorosulfonic acid used for the solid polymer electrolyte membrane of the direct methanol fuel cell and fine powder perfluorosulfonic acid added in the fuel electrode along with the fuel electrode catalyst and PTFE fine powder elute into a methanol aqueous solution that is the fuel. Since when this degradation mode occurs, the fine powder perfluorosulfonic acid that is functioning as a kind of binder in the fuel electrode will lose its function, electrode materials, such as a fuel electrode catalyst and PTFE fine powder, elute into the methanol aqueous solution that is the fuel, which makes the fuel turn black abruptly (hereinafter referred to as "black coloration" for simplicity) and decreases the cell characteristic significantly. It is thought that this black coloration of the fuel results from mixing of a black fuel electrode catalyst into the fuel. In this degradation mode, a cell characteristic declines rapidly, and the degradation phenomenon is irreversible; i.e., it is considered that once it occurred, there is no measure of recovery.

The inventors have found the above-mentioned degradation mode by carrying out operating tests of the direct methanol fuel under various conditions and investigating stability of cell-constituting materials related to a methanol aqueous solution that was the fuel. Furthermore, the inventor found that in order to solve this degradation mode, elution of the proton conductive solid polymer electrolyte into methanol-water composite fuel was prevented or controlled by heat-treating the fuel electrode, whereby the elution of the fuel electrode was able to be prevented.

The invention provides a method for preventing elution of a fuel electrode of the direct methanol fuel cell in which a fuel electrode and an air electrode each of which contains an electrode catalyst consisting of at least a noble metal or carbon supporting the noble metal and a proton conductive solid polymer electrolyte, such as perfluorosulfonic acid, are provided on respective sides of a proton conductive solid polymer electrolyte membrane and that is made capable of generating electricity by being supplied with methanol and water that is a fuel to the fuel electrode and being supplied with oxygen in the air to the air electrode, by setting methanol concentration in the fuel to be supplied to the direct methanol fuel cell to 2 M (mol/dm$^3$) or less, whereby the proton conductive solid polymer electrolyte and electrode catalyst is prevented from eluting into the fuel from the fuel electrode. The proton conductive solid polymer electrolyte added to the fuel electrode and the air electrode may be a sulfonated aromatic polymer or the like instead of perfluorosulfonic acid compounds and the like.

Preferably, the methanol concentration is set to 1.5 M or less and the operating temperature is set to 90° C., and it is especially preferable that the operating temperature is set to 80° C. or less.

Moreover, this invention relates to a quality control method of the direct methanol fuel cell in which a fuel electrode and an air electrode each of which contains an electrode catalyst consisting of at least a noble metal or carbon supporting the noble metal and a proton conductive solid polymer electrolyte, such as perfluorosulfonic acid, are provided on respective sides of a proton conductive solid polymer electrolyte membrane and that is made capable of generating electricity by being supplied with methanol and water to the fuel electrode and being supplied with oxygen in the air to the air electrode, wherein an elution characteristic of the fuel electrode materials into the fuel is evaluated.

Preferably, the elution characteristic is evaluated by detecting a change in the characteristic of the fuel electrode associated with the elution of the fuel electrode material into the fuel when the fuel electrode is brought into contact with a fuel of a concentration exceeding 2 M or a fuel at 80° C. or more, especially preferably when being brought into contact with a fuel of a concentration exceeding 2 M and at over 80° C.

Moreover, this invention relates to a operation method of a direct methanol fuel cell in which the fuel electrode and the air electrode each of which contains an electrode catalyst consisting of at least a noble metal or carbon supporting the noble metal and a proton conductive solid polymer electrolyte, such as perfluorosulfonic acid, are provided on respective sides of a proton conductive solid polymer electrolyte membrane and that is made capable of generating electricity by being supplied with methanol and water to the fuel electrode and being supplied with oxygen in the air to the air electrode, wherein when the elution of the fuel electrode material into the fuel is detected, the detection of elution is fed back so that the fuel concentration is decreased, or the operating temperature is lowered, or an output of the fuel cell is limited.

Preferably, by providing a window through which a color of the fuel is observed or a sensor for detecting the color of the fuel, the elution of the fuel electrode materials into the fuel is detected by a change in the color of the fuel.

This invention provided a direct methanol fuel cell in which the fuel electrode and the air electrode each of which contains an electrode catalyst consisting of at least a noble metal or carbon supporting the noble metal and a proton conductive solid polymer electrolyte, such as perfluorosulfonic acid, are provided on respective sides of a proton conductive solid polymer electrolyte membrane and that is made capable of generating electricity by being supplied with methanol and water to the fuel electrode and being supplied with oxygen in the air to the air electrode, further comprising: means for detecting elution of the fuel electrode materials into the fuel or inputting the detection of elution; and means for, when the detection or inputting was done, feeding back the detection of elution so that the fuel concentration is decreased, or the operating temperature is lowered, or an output of the fuel cell is limited.

Preferably, a window through which the color of the fuel is observed or a sensor for detecting the color of the fuel is provided.

This invention is based on a finding that a phenomenon in which the solid polymer electrolyte, such as perfluorosulfonic acid, in the fuel electrode, the air electrode, and the electrolyte membrane (especially that in the fuel electrode) elutes into a methanol aqueous solution that is the fuel is closely related to the methanol concentration in the fuel and the operating temperatures of the fuel cell. The phenomenon in which the solid polymer electrolyte in the fuel electrode elutes into a methanol aqueous solution that is the fuel occurs more markedly with increasing methanol concentration in the fuel and with increasing operating temperature of the cell, which the inventors have checked experimentally.

There is also a relationship between the methanol concentration in the fuel and the cell temperature. The solid polymer electrolyte membrane used for the electrolyte membrane of the direct methanol fuel cell, such as perfluorosulfonic acid, has a property of allowing methanol to permeate there through by nature. Even when a current is not taken out of the cell, a part of methanol supplied to the fuel electrode tends to permeate to the air electrode. The methanol having permeated is oxidized abruptly by air supplied to the catalyst of the air electrode and the air electrode, and the whole cell generates heat. Therefore, if a thick fuel is supplied to the cell, the cell temperature will rise further by the permeation of methanol. Furthermore, this permeation of methanol becomes larger with increasing cell temperature, and consequently once a thick fuel is supplied to the cell, the cell temperature increases rapidly and degradation of the cell will progress rapidly.

In order to prevent the elution of the fuel electrode material into the fuel in such a cell, this invention specifies the methanol concentration in the fuel to be less than 2 M, preferably to 1.5 M or less, and specifies the operating temperature of the cell to preferably 90° C. or less, more preferably to 80° C. or less. In order to prevent the elution of the fuel electrode material completely, it is effective to operate the cell at as low a methanol concentration, below 2.0 M, as possible. Desirably, the operation is in a range of 0.5-1.5 M. Especially, an operation in a range of 0.5-1.0 M is desirable.

In order to control a direct methanol fuel cell system in the operation concentration range and the operating temperature of this invention, a dummy cell for sensing the methanol concentration in the fuel may be inserted in the fuel cell stack to detect the concentration, or a methanol sensor may be disposed in the fuel tank or fuel pipe arrangement to detect it.

Moreover, regarding the cell temperature, the temperature may be detected by installing a thermocouple or thermistor directly in the fuel cell stack. Alternatively, the fuel temperature in a fuel exit of the stack or in the fuel pipe arrangement may be detected.

The detected methanol concentration and cell temperature in the fuel are taken in a control circuit, and the methanol concentration and the cell temperature are controlled so that a fuel whose methanol concentration is 2.0 M or more is not supplied to the stack and that preferably the concentration and the cell temperature are held at 1.5 M or less and 90° C. or less, respectively. However, at the time of system startup, it is desirable to supply methanol of a thick concentration of less than 2.0 M is supplied to the stack.

Regarding the methanol concentration and the operating temperature, it is desirable that the fuel cell is operated with as low a methanol concentration as possible and at as low an operating temperature as possible, as long as a necessary output of the cell can be maintained. What is necessary to perform such control is to incorporate a logical circuit like this in the previous control circuit.

Next, if the elution characteristic of the fuel electrode material into the fuel was evaluated, quality control of the direct methanol fuel cell can be performed. For quality control, the elution of the fuel electrode material may be evaluated in an acceleration mode, for example, using high-concentration methanol or at a high operating temperature, or it may be evaluated under normal operating conditions.

In addition, if during the operation of the fuel cell, the elution of the fuel electrode material is detected, and the fuel concentration is diluted, or the operating temperature is lowered, or feedback is conducted in a direction in which the output is limited, it is possible to prevent the degradation of the fuel cell from progressing and increase durability of the fuel cell. For this purpose, an inspection window may be provided in a fuel pipe, a circulation tank, etc., so that the operator is enabled to observe the black coloration etc. of the fuel visually and input the occurrence of degradation into the control circuit. Alternatively, the black coloration etc. of the fuel may be detected by a sensor, such as a calorimetric sensor, and fed back.

This invention is also a direct methanol fuel cell in which the fuel electrode and the air electrode each of which contains an electrode catalyst consisting of at least a noble metal or carbon supporting the noble metal and a proton conductive solid polymer electrolyte are provided on respective sides of a proton conductive solid polymer electrolyte membrane and that is made capable of generating electricity by being supplied with methanol and water to the fuel electrode and being supplied with oxygen in the air to the air electrode, wherein at least the fuel electrode is heat-treated.

Furthermore, this invention is a method for manufacturing a direct methanol fuel cell in which the fuel electrode and the air electrode each of which contains an electrode catalyst consisting of at least a noble metal or carbon supporting the noble metal and a proton conductive solid polymer electrolyte are provided on respective sides of a proton conductive solid polymer electrolyte membrane and that is made capable of generating electricity by being supplied with methanol and water to the fuel electrode and being supplied with oxygen in the air to the air electrode, further comprising at least the step of heat-treating at least the fuel electrode.

By this heat treatment, the elution of fine powder perfluorosulfonic acid in the fuel electrode into the methanol aqueous solution as the fuel is controlled, and thereby the fuel electrode catalyst is prevented from eluting into the fuel. It is considered that a cause by which the elution into the fuel can be controlled is a fact that the heat treatment can remove dispersant added in the solution in which the fine powder perfluorosulfonic acid is dispersed. In this solution, a small amount of surfactant is added as a dispersant in order to maintain a dispersion state of fine powder perfluorosulfonic acid. If the surfactant remains in the fuel electrode, it will progress dissolution of a resin of perfluorosulfonic acid when it contacts with the fuel. It is considered that the heat treatment volatizes such a surfactant, and thereby improves durability of the fuel electrode. Since in the heat treatment, a catalyst of platinum etc. coexists with perfluorosulfonic acid resin and PTFE, an atmosphere of the heat treatment is preferably an inert gas, such as nitrogen and $CO_2$, or vacuum in order to avoid ignition and combustion. Although perfluorosulfonic acid is assumed to exist in the form of fine powder in the electrode, it may exist in the form of a continuous membrane.

Heat treatment is conducted, for example, when pressure-joining the fuel electrode to the solid polymer electrolyte membrane at a temperature of 150-250° C., preferably 170-250° C., and most preferably 170-210° C. Pressure joining may be done either by means of hot press or hot roll, or other machine. In this case, since the air electrode is also heat-treated at the same temperature, the elution of the air electrode catalyst into methanol will be prevented also in the air electrode. This is effective as a measure against the case where the fuel permeates the electrolyte to the air electrode side (crossover phenomenon) etc.

The heat treatment is done, for example, after the fuel electrode was deposited and before it is bind to a solid polymer electrolyte, at a temperature of, for example, 120-250° C., preferably 150-250° C. Since this heat treatment vaporizes a solvent etc. that remains in the fuel electrode, this heat treatment is called drying. Moreover, the drying volatizes a surfactant. Since the heat treatment by the drying can be conducted with the surface of the fuel electrode exposed, it is more efficient than the heat treatment at the time of joining. If the two treatments are used together, it will be even more efficient.

Preferably, the fuel electrode is irradiated with radiation under heating as the above-mentioned heat treatment. A temperature of this heat treatment is set to, for example, a temperature of 120-250° C., preferably 150-250° C. The radiation is chosen to be ultraviolet rays, an electron beam, an X-ray, or the like. The irradiation with radiation under heating can promote bridge formation of perfluorosulfonic acid polymer, and thus prevent the elution thereof into the fuel.

DETAILED DESCRIPTION OF THE INVENTION

Example 1

Figure 1:
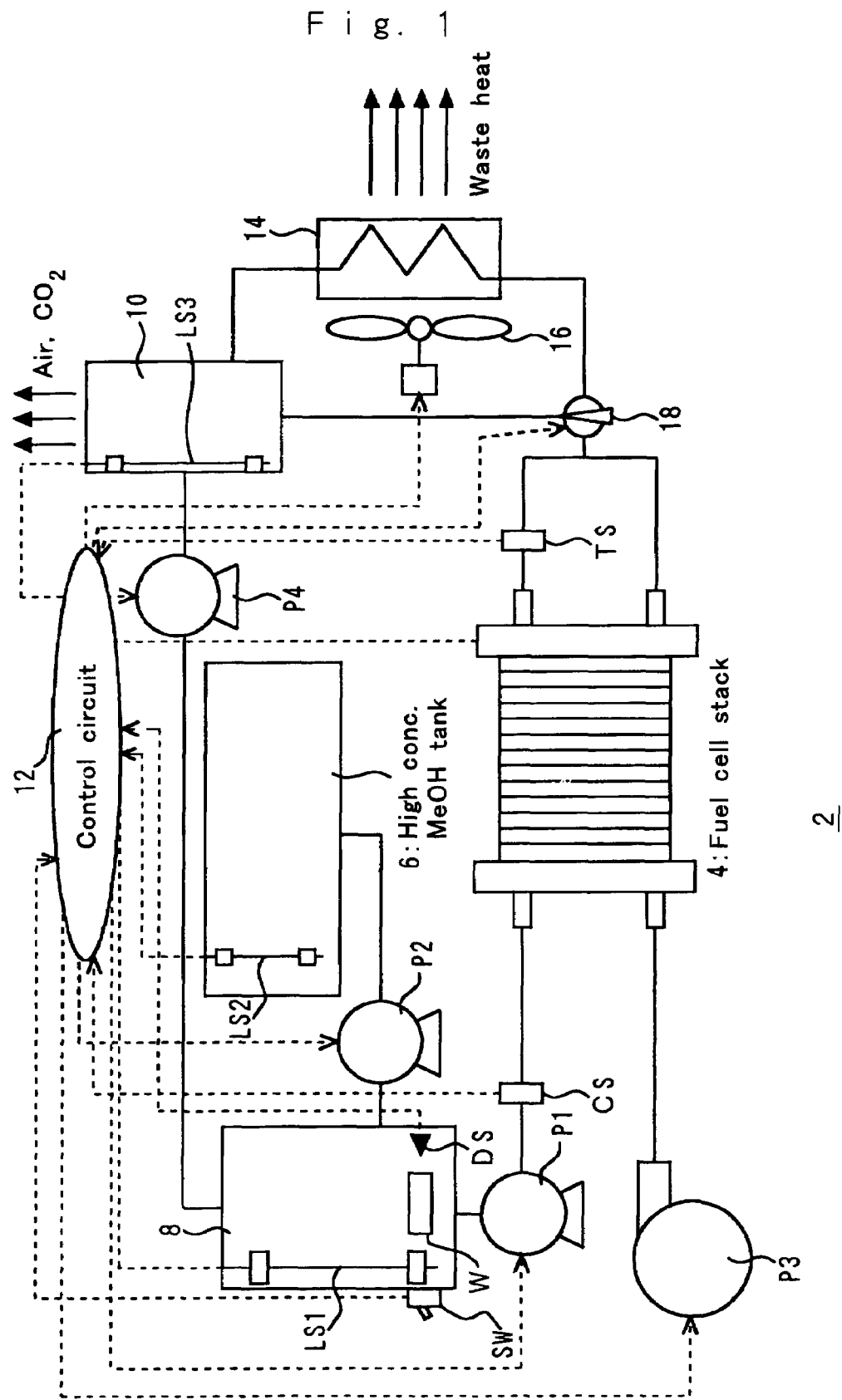
FIG. 1 is a block diagram of an example of a direct methanol fuel cell.

Hereafter, an example related to an operation of a direct methanol fuel cell, quality control, etc. will be described. For the electrolyte membrane, Nafion of Du Pont (Nafion is a registered trademark) that is a popular perfluorosulfonic acid electrolyte membrane was used. The air electrode was produced as followed: air electrode catalyst that was platinum fine powder as an air electrode material supported on carbon powder and PTFE fine powder were mixed with a solution of the perfluorosulfonic acid electrolyte (Nafion) to a paste, the paste was applied on carbon paper that was subjected to water repellent treatment by impregnating thereinto a PTFE (polytetrafluoroethylene) solution, as a gas diffusion layer, and the carbon paper was dried at 100° C. The fuel electrode was produced as followed: fuel electrode catalyst that was platinum-ruthenium fine powder as a fuel electrode material supported on carbon powder and PTFE fine powder were mixed with a solution of Nafion to a paste, the paste was applied on carbon paper that was subjected to water repellent treatment in the same manner as the air electrode, and the carbon paper was dried at 100° C. The air electrode and the fuel electrode was dried, stacked on the electrolyte membrane, and jointed by hot press at 130° C. to obtain a MEA (Membrane Electrode Assembly). Inside the MEA, the Nafion solution in the electrode is dried to become in a resin state, and plays roles of providing proton conductivity to the electrode portion and combining the catalyst and PTFE fine powder, acting as a kind of binder. Moreover, perfluorosulfonic acid exists in the electrode in the form of fine powder, but it may exist in the form of a continuous membrane. Moreover, fine powder of platinum called platinum black may be used for the air electrode catalyst, and fine powder of platinum and ruthenium called platinum-ruthenium black may be used for the air electrode catalyst.

Then the MEA thus prepared was sandwiched with an air electrode separator plate (slot depth: 3 mm, slot width: 3 mm) and a fuel electrode separator plate (slot depth: 1 mm, slot width: 3 mm) both of which are made of graphite into which a phenol resin was impregnated for prevention of gas leak to constitute a unit cell.

Next, in order to check the effect of this invention, the characteristic degradation by the above-mentioned degradation mode was verified for the unit cell. Under the standard conditions of temperature: 80° C., fuel velocity: 4 ml/min, and air velocity 1 l/min using 1 M methanol aqueous solution as a fuel, an initial characteristic of the unit cell was evaluated. Next, the unit cell whose initial characteristic has been evaluated was continuously operated outputting 200 mA/cm$^2$ for eight hours with various methanol concentrations at various operating temperatures. After the continuous operation, the fuel cell was tested again under the same standard conditions as was used to measure the initial characteristic, an output density at a current density of 200 mA/cm$^2$ before and after the continuous test were calculated, and the characteristic degradation was evaluated from the change. Furthermore, dropping of the fuel electrode catalyst was checked by observing the color of the fuel waste fluid visually after the test. The fuel waste fluid that turned black was analyzed and the existence of platinum and ruthenium was checked by the atomic absorption method.

Tables 1-5 show test results. In a fuel concentration of 0.5 M at less than 80° C., eight-hour continuous operation could not be performed for a current density of 200 mA/cm$^2$. It was found that in the case of too low a fuel concentration, continuous operation was inoperable. However, in fuel concentrations of 1.0M and 1.5M, continuous operation was possible in a temperature range of 50-90° C., where the black coloration of the fuel and the characteristic degradation were not observed, but a phenomenon of somewhat improved characteristic was observed.

TABLE 1

Effect of this invention

| | | | | | | | |
|---|---|---|---|---|---|---|---|
| Continuous test conditions | Set temp. (° C.) | 50 | 60 | 70 | 80 | 85 | 90 |
| | Fuel MeOH conc. | 0.5 M | 0.5 M | 0.5 M | 0.5 M | 0.5 M | 0.5 M |
| Output density (mW/cm$^2$) | Before continuous operation | 72 | 75 | 75 | 74 | 71 | 73 |
| | After continuous operation | — | — | — | 75 | 73 | 74 |
| Black coloration of waste fuel | | — | — | — | No | No | No |
| Remark | | At a set temperature of 50-70° C. and with a fuel MeOH conc. of 0.5 M, the cell was unable to operate continuously outputting 200 mA/cm$^2$. | | | | | |

TABLE 2

Effect of this invention

| | | | | | | | |
|---|---|---|---|---|---|---|---|
| Continuous test conditions | Set temp. (° C.) | 50 | 60 | 70 | 80 | 85 | 90 |
| | Fuel MeOH conc. | 1.0 M | 1.0 M | 1.0 M | 1.0 M | 1.0 M | 1.0 M |
| Output density (mW/cm$^2$) | Before continuous operation | 75 | 74 | 71 | 74 | 73 | 72 |
| | After continuous operation | 76 | 75 | 75 | 76 | 73 | 76 |
| Black coloration of waste fuel | | No | No | No | No | No | No |

TABLE 3

Effect of this invention

| Continuous test conditions | Set temp. (° C.) | 50 | 60 | 70 | 80 | 85 | 90 |
|---|---|---|---|---|---|---|---|
| | Fuel MeOH conc. | 1.5 M | 1.5 M | 1.5 M | 1.5 M | 1.5 M | 1.5 M |
| Output density (mW/cm$^2$) | Before continuous operation | 72 | 74 | 74 | 73 | 73 | 75 |
| | After continuous operation | 74 | 76 | 75 | 74 | 73 | 74 |
| Black coloration of waste fuel | | No | No | No | No | No | No |

TABLE 4

Effect of this invention

| Continuous test conditions | Set temp. (° C.) | 50 | 60 | 70 | 80 | 85 | 90 |
|---|---|---|---|---|---|---|---|
| | Fuel MeOH conc. | 2.0 M | 2.0 M | 2.0 M | 2.0 M | 2.0 M | 2.0 M |
| Output density (mW/cm$^2$) | Before continuous operation | 70 | 73 | 73 | 73 | 74 | 74 |
| | After continuous operation | 74 | 75 | 74 | 72 | 70 | 68 |
| Black coloration of waste fuel Remark | | No | No | No | Blackened Pt, Ru Detected | Blackened Pt, Ru Detected | Blackened Pt, Ru Detected |

TABLE 5

Effect of this invention

| Continuous test conditions | Set temp. (° C.) | 50 | 60 | 70 | 80 | 85 | 90 |
|---|---|---|---|---|---|---|---|
| | Fuel MeOH conc. | 2.5 M | 2.5 M | 2.5 M | 2.5 M | 2.5 M | 2.5 M |
| Output density (mW/cm$^2$) | Before continuous operation | 72 | 73 | 71 | 72 | 74 | 73 |
| | After continuous operation | 71 | 65 | 60 | 62 | 51 | 48 |
| Black coloration of waste fuel Remark | | Blackened Pt, Ru Detected | Blackened Pt, Ru Detected | Blackened Pt, Ru Detected | Blackened Pt, Ru Detected | Blackened Pt, Ru Detected | Blackened Pt, Ru Detected |

In continuous operation of 2.0 M at 80° C. or more, the fuel turned back and the existence of Pt and Ru was found in the fuel. It was found that under these conditions, although the electric potential of the fuel electrode did not exceed an elution electric potential of Ru, Nafion of the fuel electrode eluted in the above-mentioned degradation mode and a part of the electrode catalyst drained away. With a fuel of 2.5 M, the phenomenon became further remarkable, and abrupt characteristic degradation was found at any of temperatures at which examination was done this time. Moreover, higher the operating temperature, more significant this phenomenon became. Note that, in this fuel cell, a phenomenon at which the fuel electrode catalyst elutes into the fuel because the electric potential of the fuel electrode exceeds the elution electric potential of Ru is called "polarity reversal".

Next, FIG. 1 shows one example of this invention by way of an example. In the figure, the reference numeral 2 denotes a direct methanol fuel cell, 4 denotes a fuel cell stack, and 6 denotes a high concentration methanol tank, which stores high-concentration methanol, such as pure methanol and 60 wt % methanol. 8 denotes a circulation tank, which stores methanol-water fuel of a concentration of 0.5-2 M, 10 denotes a waste liquid tank, which also serves as a vapor-liquid separator, and 12 denotes a control circuit. 14 denotes a radiator for cooling, 16 denotes its fan, and 18 denotes a bypass valve that allows the fuel to bypass the radiator 14. The symbol P1 denotes a fuel supply pump, and P2 denotes a fuel adjusting pump, both of which supply high concentration methanol to the circulation tank 8. P3 denotes an air pump, and P4 denotes a waste liquid pump, both of which inject the waste liquid into the circulation tank 8.

Various kinds of sensors are installed in the fuel cell 2. CS denotes a methanol concentration sensor, and TS denotes a temperature sensor, which detects a waste liquid temperature. Since this temperature is almost equal to the temperature inside the stack 4, the temperature of the temperature sensor TS is assumed as an operating temperature. LS1 to LS3 denote level sensors. The level sensor LS1 detects the liquid level of the circulation tank 8, the level sensor LS2 detects the liquid level of the high concentration methanol tank 6, and the level sensor LS3 detects the liquid level of the waste liquid tank 10.

DS denotes a degradation sensor, which detects the elution and the polarity reversal of an electrode. For example, the DS sensor is an optical sensor, a calorimetric sensor, or the like, which detects the black coloration or change in the color of the fuel resulting from the elution of the electrode catalyst. The sensor detects a change in the electric characteristics, such as conductivity, permittivity, and a dielectric loss of the fuel. In other case, the DS sensor is an ion sensor, which detects fluoro ion based on Nafion eluted into the fuel. In other case, the DS sensor is a pH sensor, which detects a change in pH resulting from the elution of Nafion that is a strongly acidic material. In the case where a change of the color or a change in the electric characteristics is detected, the polarity reversal can also be detected in addition to the elution of the fuel electrode materials, whereas in the case where fluoro ion is detected or pH is monitored, mainly the elution of the fuel electrode material is detected. The change of the color and the change in the electrical characteristics of the fuel is mainly caused by catalyst eluted into the fuel (carbon powder and Pt, Ru, etc.), and so it is preferable that the degradation sensor DS is installed in the circulation tank where these substances tend to accumulate, especially in a position of its lower part. In the case of detection of fluoro ion and detection of pH, the installation position of the degradation sensor DS is arbitrary. The black coloration of the fuel can be detected visually. For example, an inspection window W is provided in the lower part of the circulation tank 8 in order to allow the operator to check the color of the fuel tank from the outside. Further, the fuel cell is configured to, when the operator found the black coloration visually, allow the operator to input the detection of the black coloration into the control circuit 12 by a manual switch SW.

Opening and shutting of the pump, the sensor, and the valve need to be managed by the control circuit 12, and controlled according to a state of the fuel cell system. Table 6 and Table 7 show one example of the control method. When the fuel concentration falls to 0.5 M or less, the fuel adjusting pump is operated, a fixed quantity of high concentration methanol is supplied to the fuel circulation tank, and the methanol concentration of the fuel in the fuel circulation tank is made high in the range of less than 2 M. On the other hand, since, when the fuel level of the fuel circulation tank is in a filled state, high-concentration methanol cannot be added, it is necessary to increase the operating temperature in a range of not more than 80° C., increase evaporation of water, and lower the fuel level. For this reason, for example, the fuel is made to bypass the radiator mechanism and the operating temperature is intended to be raised. In this case, it is desirable that the fuel velocity is not too large. Moreover, as another method, it can be considered that the fuel adjusting pump is reversely rotated, a part of the fuel in the fuel circulation tank is pumped up to a high-concentration methanol tank, and thus the fuel level is lowered.

TABLE 6

Method for controlling a fuel cell system (When the circulation tank is not filled up)

| | Fuel concentration | | | Cell temperature | | |
|---|---|---|---|---|---|---|
| | Less than 0.5 M | Normal operation (0.5-2 M) | More than 2 M | At the time of start or less than set temp. | Normal operation within set temp. | 80° C. or more |
| ①Air pump | — | — | — | — | — | — |
| ②Fuel supply pump | Fluid velocity large | — | Fluid velocity large | Fluid velocity small | — | Fluid velocity large |
| ③Fuel conc. Adjustment pump | Fuel conc. larger (<2 M) | — | Fuel conc. smaller (≧0.5 M) | Fuel conc. larger (<2 M) | — | Fuel conc. smaller (≧0.5 M) |
| ④Waste liquid pump | Fluid velocity large | — | Fluid velocity large | Fluid velocity small | — | Fluid velocity large |
| ⑤Radiator bypass valve | — | — | — | Bypass side | Radiator side | Radiator side |
| ⑥Radiator Fan | — | — | — | Stopped | In operation | In operation |

TABLE 7

Method for controlling a fuel cell system (When the circulation tank is filled up.)

| | Fuel concentration | | | Cell temperature | | |
|---|---|---|---|---|---|---|
| | Less than 0.5 M | Normal operation (0.5-2 M) | More than 2 M | At the time of start or less than set temp. | Normal operation within set temp. | 80° C. or more |
| ①Air pump | — | — | — | — | — | — |
| ②Fuel supply pump | Fluid velocity small | — | Fluid velocity large Pump is reversely rotated to lower circulation tank level | Fluid velocity small | — | Fluid velocity large Pump is reversely rotated to lower circulation tank level |

TABLE 7-continued

Method for controlling a fuel cell system (When the circulation tank is filled up.)

|  | Fuel concentration | | | Cell temperature | | |
| --- | --- | --- | --- | --- | --- | --- |
|  | Less than 0.5 M | Normal operation (0.5-2 M) | More than 2 M | At the time of start or less than set temp. | Normal operation within set temp. | 80° C. or more |
| ③Fuel conc. Adjustment pump | Fuel conc. larger (<2 M) | — | Fuel conc. smaller (≧0.5 M) | Fuel conc. larger (<2 M) | — | Fuel conc. smaller (≧0.5 M) |
| ④Waste liquid pump | Fluid velocity small | — | Fluid velocity large | Fluid velocity small | — | Fluid velocity large |
| ②Radiator bypass valve | Bypass side | — | Radiator side | Bypass side | Radiator side | Radiator side |
| ⑥Radiator Fan | Stopped | — | In operation | Stopped | In operation | In operation |

If the fuel concentration has become equal to or more than 2 M, a drain pump is operated, so that low-concentration methanol waste liquid recovered in the waste liquid is supplied into the fuel circulation tank. Moreover, in the case where the fuel level of the fuel circulation tank is at a filled state, it is also considered that, since low-concentration methanol waste liquid cannot be added, the fuel is made to bypass the radiator mechanism as in the previous case, and thereby the operating temperature is intended to be raised. However, when the fuel temperature is raised, degradation of MEA in the degradation mode of this invention progresses; therefore, it is desirable not to raise the operating temperature. For this reason, a method whereby the fuel adjusting pump is reversely rotated, a part of the fuel in the fuel circulation tank is pumped up to the high-concentration methanol tank, and the fuel level is lowered is considered effective.

Next, at the time of starting the cell or in the case where the operating temperature becomes less than the set temperature, in order to raise the cell temperature, the fuel can be controlled not to be cooled in the radiator by switching the radiator bypass valve to a bypass side, and the cell temperature can be intended to be raised through the use of methanol cross over by increasing the fuel concentration in a range of less than 2 M.

At the time of the cell temperature exceeding 80° C., in order to lower the cell temperature, the radiator by-pass valve can be set to allow the fuel to pass through the radiator, and the fuel concentration can be decreased in a rage where the fuel concentration never goes below 0.5 M.

Figure 2:
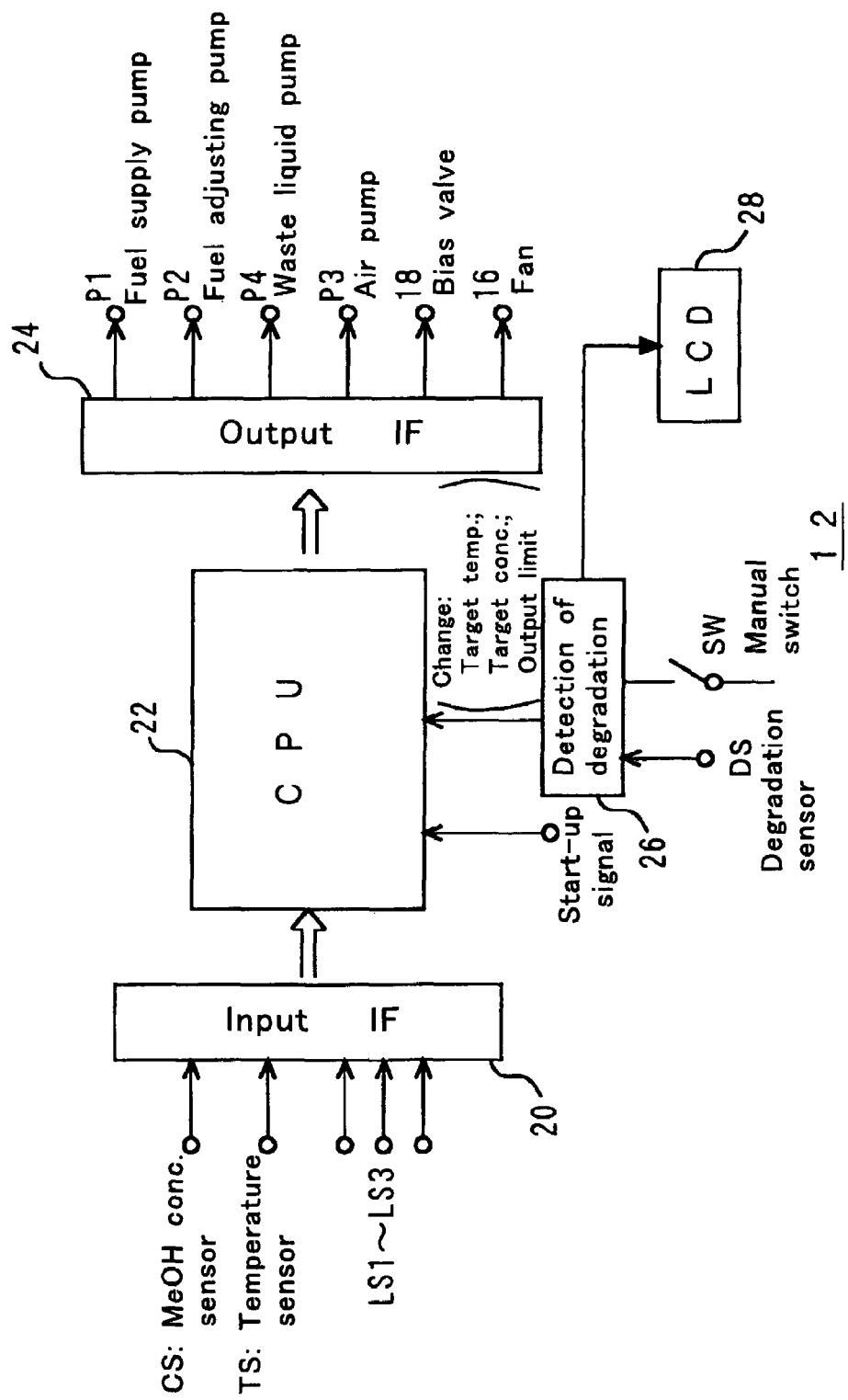
FIG. 2 is a block diagram of a control unit in the example.

FIG. 2 shows a configuration of the control circuit 12. The reference numeral 20 denotes an input interface through which signals from the sensors CS, TS, LS1-LS3, etc. are inputted, whereby the control circuit 12 detects a state of the fuel cell. A CPU (Central Processing Unit) 22 drives pumps P1-P4, the by-pass valve 18, the fan 16, etc. using sensor signals from the input interface 20, a start signal, and a signal from a degradation detection unit 26 through an output interface 24. The start signal is generated at the time of start of the fuel cell 2. During a predetermined time from the start or in a time until the fuel cell temperature reaches a predetermined temperature after the start, the CPU alters the control target so that the target temperature becomes slightly higher (yet 80° C. or less) and the fuel concentration becomes slightly thicker (yet less than 2 M) as shown in Table 6 and Table 7.

The degradation detection unit 26 detects degradation based on a signal from a manual switch SW or the degradation sensor DS, and accordingly the CPU changes a control target.

Here, for example, it is assumed that a state of the fuel cell can be distinguished on four levels: Degradation Not Observed, Degradation Level 1, Degradation Level 2, and Degradation Level 3, based on the signal of the degradation sensor DS. The control and the alteration are conducted as follows: in the case of Degradation Not Observed, the control is done under the conditions described in Table 6, Table 7, etc.; in Degradation Level 1, an upper limit of the fuel cell is altered to 1.5 M and the upper limit of the cell temperature is altered to 70° C.; in Degradation Level 2, the upper limit of the fuel cell is altered to 1 M and the upper limit of the cell temperature is altered to 60° C.; and in Degradation Level 3, the operation of the fuel cell is ended. The degradation detection unit 26 displays the degree of degradation etc. on the display unit, such as an LCD 28. Processing when degradation was detected is to block progress of degradation by lowering a target value of the fuel concentration and lowering the target value of the operating temperature in the fuel cell. Alternatively, instead of lowering target values of the fuel concentration and the operating temperature, or in addition to these measures, the upper limit may be imposed on the output (i.e., output current, output power, etc.) of the fuel cell. If there is already the upper limit, the output may be limited by lowering the upper limit or by other measures. By these measures, the life and durability of the fuel cell can be extended largely.

Next, the elution of the fuel electrode will be explained in terms of quality control of the fuel cell. For example, if the produced fuel cell is operated under predetermined conditions as a unit cell or in a fuel cell stack and existence of the elution of the fuel electrode material is inspected, quality control of the fuel cell can be performed. The fuel cell is operated under operating conditions severer than normal operating conditions, for example, for a typical sample, i.e., a methanol concentration exceeding 2 M, for example, 4M-60% etc., and an operating temperature exceeding 80° C., for example, 90-110° C. etc. Elution characteristics, including the existence of elution of the fuel electrode material into the fuel and the amount of elution are measured. Alternatively, a change in a voltage-current characteristic etc. before and after such durable conditions order etc. is measured.

Instead of the acceleration test as described above, existence of the elution of the fuel electrode materials, a change in the voltage-current characteristic, etc. when the fuel cell is operated under normal use conditions may be measured. Moreover, instead of evaluating the elution characteristic of a cell, such as a unit cell and a fuel cell stack, the elution characteristic may be evaluated for the fuel electrode alone. For example, the elution may be measured as follows. MEA is produced as described in the method for producing an MEA, a paste of the fuel electrode material is applied on carbon paper that was subjected to water repellent treatment, and the paste is dried at a temperature corresponding to the hot press temperature or the like. Preferably, the drying temperature is a maximum temperature that MEA experiences in its production, but it may be other temperatures as long as the temperature falls in a range where the temperature can be correlated with the elution characteristics of the fuel electrode material in the MEA. Then the elution of the fuel electrode material into the fuel is evaluated for a dried single fuel electrode.

In order to find the existence and degree of the elution of the fuel electrode materials, —both in the case of evaluation of it with the unit cell or the fuel cell stack and in the case of evaluation of it using the fuel electrode alone from a change of the characteristic—a phenomenon of the black coloration of the fuel, a change in the electrical characteristic, detection of fluoro ion, a change of pH, trace atomic analysis such as atomic absorption spectrometry, etc. may be employed. Moreover, the elution of the fuel electrode material can be indirectly evaluated from a change of the voltage-current characteristic etc. before and after the endurance test. Solvents used in the evaluation are not limited to methanol-water; polar solvents, such as isopropanol-water, can be used for the solvent.

Figure 3:
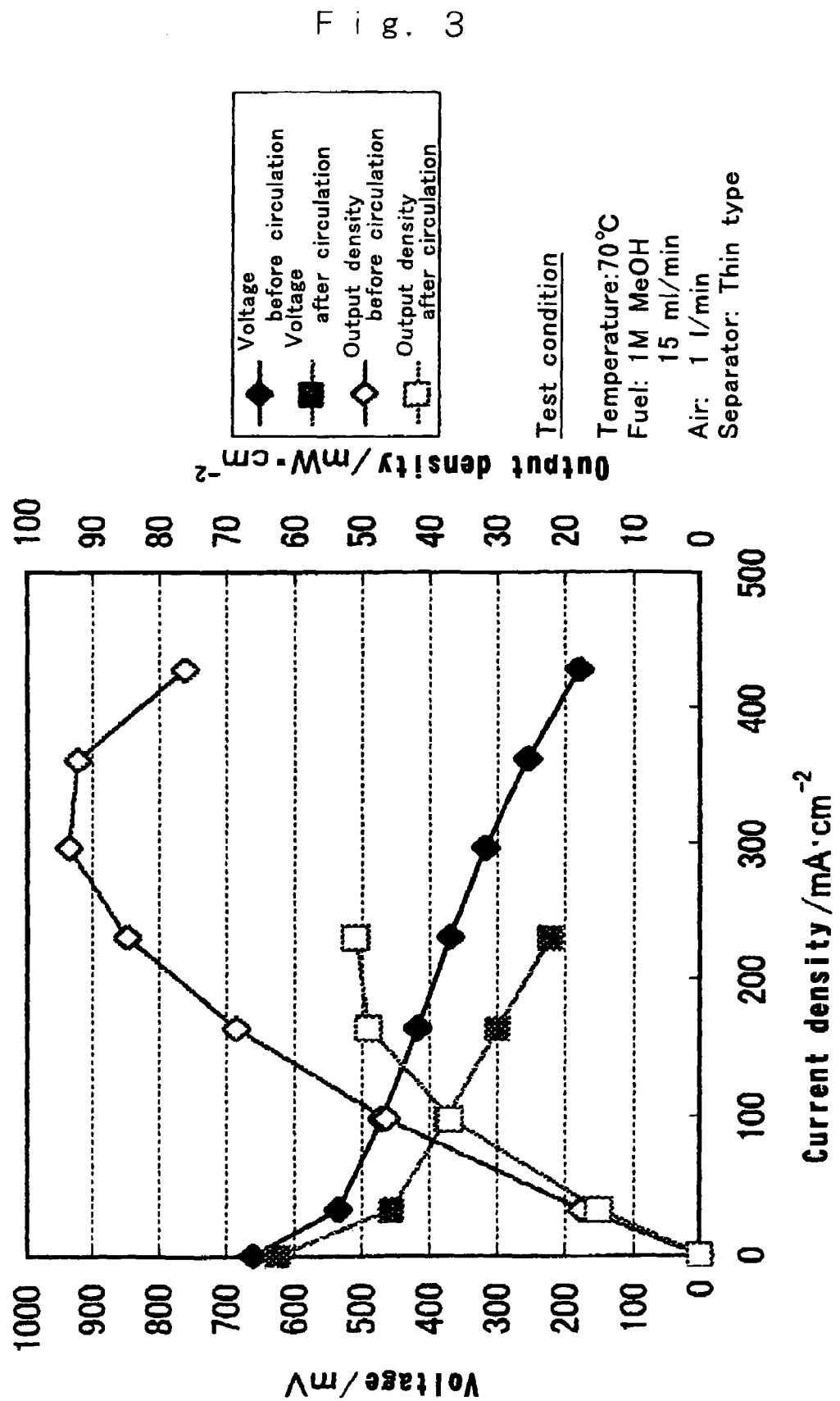
FIG. 3 is a characteristic diagram showing a change in a voltage-current characteristic accompanying the elution of a fuel electrode.

FIG. 3 shows a change of the voltage-current characteristic before and after an endurance test where the fuel cell is operated in a range of 80° C. (minimum temperature) to 90° C. (maximum temperature) for 30 minutes using a methanol-water composite fuel of 6 M. The test conditions of 1M MeOH at 70° C. are measurement conditions of the voltage-current characteristic before and after the endurance test. In this example, a temperature of hot pressing of the fuel electrode and the air electrode to the solid electrolyte membrane (Nafion membrane) was set to 190° C., so that the elution of Nafion in the fuel electrode was controlled. When methanol of 6 M was used, the elution of the fuel electrode catalyst into the fuel was detected: the elution quantity was larger with decreasing hot press temperature, and the influence of a 30-minute operation in 6 M methanol was larger with decreasing hot press temperature.

Although Nafion (registered trademark of Du Pont) was used as the proton conductive solid polymer electrolyte, other perfluorosulfonic acid polymers, sulfonic acid compounds of aromatic polymers, etc. may be used.

Example 2

Hereafter, an example regarding the heat treatment of MEA will be described. First, for the proton conductive solid polymer electrolyte membrane, Nafion membrane (trade name Nafion 117) of Du Pont that is common as a perfluorosulfonic acid electrolyte was used. For the air electrode, a carbon paper (PTFE content of 5%) that was subjected to water repellent treatment by impregnating it with a PTFE solution was used as a gas diffusion layer. For the air electrode catalyst, carbon powder consisting of acetylene black that was made to support thereon platinum fine powder was used. Preferably, platinum content in the catalyst is, for example, 40 wt %, preferably 10-70 wt %. Incidentally, % as a unit of concentration means wt % in this specification. For the solution of perfluorosulfonic acid resin, a Nafion solution (isopropanol solvent) of Ardrich Company was used. This solution contains a small amount of a surfactant in order to disperse Nafion. Then the air electrode catalyst, the PTFE fine powder, and the Nafion solution were mixed to a paste form, applied on the gas diffusion layer, and dried.

The fuel electrode material was almost the same as the air electrode, and differed only in a point that platinum-ruthenium fine powder was used instead of platinum. The sum total content of platinum and ruthenium in the catalyst is specified to, for example, 40%, preferably 10-70%, and a weight ratio of platinum and ruthenium is preferably about 5:1 to 1:2, being set to 2:1 in this example. Drying was conducted in nitrogen as will be described later by way of example, but the drying may be conducted in other inert gasses or in a vacuum (for example, at 10 kPa or less, preferably at 1 kPa or less).

Compositions of the perfluorosulfonic acid resin, PTFE, and the catalyst in the fuel electrode and the air electrode may be determined freely according to known technology. In the example, MEA such that the content of perfluorosulfonic acid resin in the fuel electrode was increased compared to that in the air electrode was prepared. The compositions of MEA used for the examination are as follows: the fuel electrode contains 30% perfluorosulfonic acid resin, 15% PTFE, and 55% catalyst; and the air electrode contains 20% perfluorosulfonic acid resin, 15% PTFE, and 65% catalyst. Then, by changing a drying temperature and a hot press temperature of the fuel electrode as will be described later, effectiveness of this invention was examined. Although the hot press was also conducted in nitrogen by way of example, it may be conducted in other inert gases and in a vacuum (for example, at 10 kPa or less, preferably 1 kPa or less).

Then, the MEA thus prepared was sandwiched by an air electrode separator plate (slot depth: 3 mm, slot width: 3 mm) and a fuel electrode separator plate (slot depth: 1 mm, slot width: 3 mm) both of which were made of a graphite into which a phenol resin for prevention of gas leak was impregnated, whereby a unit cell was constructed.

Next, in order to verify the effect of this invention, characteristic degradation in the above-mentioned degradation mode was verified. A unit cell whose initial characteristics were evaluated under standard conditions of a fuel flow velocity: 4 ml/min and an air flow velocity: 1 l/min by using an 80° C., 1M methanol aqueous solution as a fuel was operated continuously with a methanol concentration of 3.0 M, outputting 200 mA/cm$^2$, at 80° C. for eight hours. After the continuous operation, the cell was tested again under the same standard conditions as were used to measure the initial characteristics, output densities at a current density of 200 mA/cm$^2$ before and after the continuous operation were calculated, and the characteristic degradation was evaluated from a change of the output densities. Moreover, whether the fuel electrode catalyst dropped out was determined by observing the color of the fuel waste fluid visually after the test. Furthermore, the fuel waste fluid that turned black was analyzed, the existence/absence of platinum and ruthenium was checked by the atomic absorption method.

Tables 8 and 9 show the test results. In each test, drying time of each electrode was set to 30 minutes and a hot press time was set to 3 minutes. First, for the MEA prepared with the usual hot press temperature (140° C.) and the usual electrode drying temperature (70° C. or 100° C.), the samples turned black by continuous operation with 3.0M at 80° C. even for the drying temperatures being set to 70° C. and 100° C., and Pt and Ru were detected in the fuel. Moreover, as shown in Table 8, effectiveness of this invention was checked by changing the hot press temperature while the drying temperature of the electrode was not changed. As a result, although the fuel turned black and a characteristic decline was also recognized for a hot press temperature of 150° C., the characteristic decline was able to be controlled smaller than that under conventional conditions. The black coloration of the fuel was not observed for temperatures of 170° C. and 250° C., and a characteristic decline was hardly be recognized. Moreover, in the case of 260° C., the black coloration of the fuel was not observed, but an initial characteristic declined significantly.

TABLE 8

Effect of hot press temperature

| | | | | | | | |
|---|---|---|---|---|---|---|---|
| Heat Treatment Temperature (° C.) | Fuel electrode drying temperature | 70 | 100 | 100 | 100 | 100 | 100 |
| | Air electrode drying temperature | 70 | 100 | 100 | 100 | 100 | 100 |
| | Hot press temperature | 140 | 140 | 150 | 170 | 250 | 260 |
| Output density (mW/cm$^2$) | Before continuous operation | 72 | 75 | 73 | 74 | 75 | 55 |
| | After continuous operation | 45 | 50 | 62 | 70 | 73 | 52 |
| Black coloration of fuel waste fluid | | Blackened | Blackened | Blackened | No | No | No |
| Remark | | Pt, Ru Detected | Pt, Ru Detected | Pt, Ru Detected | | | |

Next, as shown in Table 9, the effectiveness of this invention was verified with the hot press temperature and the drying temperature of the air electrode being set to the conventional temperatures while the fuel electrode drying temperature was changed. As a result, for the fuel electrode drying temperatures of 150° C., 170° C., and 250° C., the black coloration of the fuel was not observed, and a characteristic decline was hardly be recognized. Moreover, in the case of 260° C., although the black coloration of the fuel was not observed, the initial characteristics declined significantly.

TABLE 9

Effect of drying temperature

| | | | | | |
|---|---|---|---|---|---|
| Heat Treatment Temperature (° C.) | Fuel electrode drying temperature | 150 | 170 | 250 | 260 |
| | Air electrode drying temperature | 100 | 100 | 100 | 100 |
| | Hot press temperature | 140 | 140 | 140 | 140 |
| Output density (mW/cm$^2$) | Before continuous operation | 72 | 74 | 71 | 58 |
| | After continuous operation | 72 | 70 | 73 | 50 |
| Black coloration of fuel waste fluid | | No | No | No | No |

The above-mentioned result indicates that the manufacture method of this invention has an effect to prevent decrease in the characteristic resulting from the elution of Nafion from the electrode in the direct methanol fuel cell. The methanol aqueous solution of 3.0M used for the examination is a fuel of about three times higher concentration than the normal methanol-water composite fuel, considering that the concentration of the latter is about 1M. Note that over the long term, there is a fear that methanol permeated through the electrolyte may elute Nafion of the air electrode, it is desirable to dry the air electrode along with the fuel electrode in a temperature of 120-250° C., preferably 150-250° C.

Next, both the air electrode and the fuel electrode were dried at 100° C., and after the drying before the hot press—under a condition that the fuel electrode was hot-pressed at 140° C. —the fuel electrode was treated with ultraviolet ray irradiation. The fuel electrode was heated at 200° C. at the time of ultraviolet ray irradiation, and by this treatment the fuel does not exhibit the black coloration by the eight-hour continuous operation with 3.0 M at 80° C. Ultraviolet ray irradiation on the fuel electrode alone is efficient compared to ultraviolet ray irradiation on the whole MEA in a respect that the fuel electrode can be irradiated in a concentrated manner. Moreover, the ultraviolet ray irradiation may be replaced with electron beam irradiation, X-ray irradiation, or the like.

Samples each of which has a MEA of the following altered composition were prepared: for the fuel electrode, 25% perfluorosulfonic acid resin, 15% PTFE, 60% catalyst; and for the air electrode, 20% perfluorosulfonic acid resin, 15% PTFE, and 65% catalyst, while other respects were kept similarly. This sample was subjected to the eight-hour continuous operation test with 3.0 M at 80° C. When the drying temperature of the fuel electrode was 150-250° C. or the hot press temperature was 170-250° C., the black coloration of the fuel waste fluid was not produced.

It is considered that in this invention, the heat treatment changes the glass transition point Tq, a decomposition temperature, or ion exchange capacity, etc. of perfluorosulfonic acid. For this reason, whether the heat treatment of this invention was conducted can be determined from measurement of the above-mentioned characteristics.

In this paragraph, preferred embodiment in terms of heat treatment will be shown. For the proton conductive solid polymer electrolyte membrane, Nafion 117 (Nafion is a registered trademark) was used. The composition of the fuel electrode was determined as follows: perfluorosulfonic acid resin of the fuel electrode was 30 wt %; PTFE was 15 wt %; the catalyst was 55 wt %; and Pt—Ru was a weight ratio of 2:1 with a platinum group content of 40 wt %. For the air electrode, perfluorosulfonic acid resin was 20 wt %, PTFE was 15 wt %, and Pt—C catalyst was 65 wt % with a platinum group content of 40 wt %.

Drying is conducted at 100° C. in nitrogen for 30 minutes for both the fuel electrode and the air electrode. The hot press was specified as follows, a temperature of the electrode shall rise from room temperature to a maximum temperature in 20 minutes under a pressure of 10 Mpa in nitrogen, the electrode shall be is kept at the maximum temperature for five minutes and cooled down to room temperature in three minutes, and then pressurization shall be released. In addition, a maximum temperature was set to the hot press temperature in the above-mentioned example. The holding time in the maximum temperature is determined, for example, to be 2-10 minutes. If it is 3-8 minutes, almost the same result will be obtained. Regarding a temperature rise time, if it is any of 10-30 minutes, almost the same result will be obtained. Regarding a temperature fall time, if it is any of 1-10 minutes, almost the same result will be obtained. Under particular pressures of 3-20 MPa, each pressure will bring almost the same result. The pressure and times of temperature rise, maximum temperature holding, and temperature fall were set common. A maximum temperature was set to five kinds of temperatures: 160° C., 170° C., 190° C., 210° C., and 230° C.

With a methanol concentration of 3.0 M, the fuel cell was continuously operated outputting 200 mA/cm$^2$ at 90° C. for 8 hours, and characteristics were evaluated. Other respects are the same as those of the previous example. Table 10 shows the results. Table 10 indicates optimum hot press conditions as follows: the maximum temperature is 170-210° C., a holding time of the maximum temperature is 1-10 minutes, preferably 3-8 minutes, the pressure at the time of hot press is 3-20 MPa, the rise time is 10-30 minutes, and preferably the fall time is 1-10 minutes.

TABLE 10

Effect of drying temperature

| | | Hot press temperature (° C.) | | | | |
| --- | --- | --- | --- | --- | --- | --- |
| | | 160 | 170 | 190 | 210 | 230 |
| Output density ($mW/cm^2$) | Before continuous operation | 74 | 73 | 75 | 75 | 73 |
| | After continuous operation | 63 | 71 | 72 | 72 | 68 |
| Existence of black coloration of fuel waste fluid | | Existence | No | No | No | No |

The invention claimed is:

1. An operational method of using a direct methanol fuel cell in which a fuel electrode and an air electrode, each of which contains an electrode catalyst consisting of at least a noble metal or carbon supporting the noble metal and a proton conductive polymer solid electrolyte, are provided on respective sides of a proton conductive polymer solid electrolyte membrane, wherein the direct methanol fuel cell is made capable of generating electricity by being supplied with methanol and water to the fuel electrode and being supplied with oxygen in the air to the air electrode, wherein, when the elution of the fuel electrode material into the fuel is detected, elution detection is fed back so that the fuel concentration is decreased, or the operating temperature is lowered, or an output of the fuel cell is limited.

2. The operational method of using a direct methanol fuel cell according to claim 1, wherein a window through which a color of the fuel is observed or a sensor for detecting the color of the fuel is provided, so that the elution of the fuel electrode material into the fuel is detected by a change in the color of the fuel.

3. A direct methanol fuel cell in which a fuel electrode and an air electrode, each of which contains an electrode catalyst consisting of at least a noble metal or carbon supporting the noble metal and a proton conductive polymer solid electrolyte are provided on respective sides of a proton conductive polymer solid electrolyte membrane, wherein the direct methanol fuel cell is made capable of generating electricity by being supplied with methanol and water to the fuel electrode and being supplied with oxygen in the air to the air electrode, further comprising:

means for detecting the elution of the fuel electrode material into the fuel; and means for, when the detection is done, feeding back the detection of elution so that the fuel concentration is decreased, or the operating temperature is lowered, or an output of the fuel cell is limited.

4. The direct methanol fuel cell according to claim 3, wherein a window through which a color of the fuel is observed or a sensor for detecting the color of the fuel is provided.

5. The operational method of using a direct methanol fuel cell according to claim 1, wherein the elution is detected by a change in the characteristic of the fuel electrode associated with the elution of the fuel electrode material into the fuel when the fuel electrode is brought into contact with the fuel whose concentration exceeds 2M or the fuel whose temperature exceeds 80° C.

* * * * *

UNITED STATES PATENT AND TRADEMARK OFFICE
CERTIFICATE OF CORRECTION

PATENT NO. : 7,674,537 B2  Page 1 of 1
APPLICATION NO. : 10/551018
DATED : March 9, 2010
INVENTOR(S) : Ryoichi et al.

It is certified that error appears in the above-identified patent and that said Letters Patent is hereby corrected as shown below:

Title Pg, Item (75) Inventors: "Okyuama Ryoichi" should read
-- Okuyama Ryoichi --

Signed and Sealed this

Twenty-seventh Day of July, 2010

David J. Kappos
*Director of the United States Patent and Trademark Office*